(12) United States Patent
Armstrong et al.

(10) Patent No.: US 7,849,347 B2
(45) Date of Patent: Dec. 7, 2010

(54) SYSTEM AND METHOD FOR UPDATING A TIME-RELATED STATE OF A MIGRATING LOGICAL PARTITION

(75) Inventors: William Joseph Armstrong, Rochester, MN (US); Adam Charles Lange-Pearson, Rochester, MN (US); Naresh Nayar, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 11/735,750

(22) Filed: Apr. 16, 2007

(65) Prior Publication Data

US 2008/0256501 A1  Oct. 16, 2008

(51) Int. Cl.
*G06F 1/00* (2006.01)
(52) U.S. Cl. ...................................... 713/500; 713/400
(58) Field of Classification Search ................. 713/500, 713/600, 400
See application file for complete search history.

(56) References Cited

U.S. PATENT DOCUMENTS

| | | | |
|---|---|---|---|
| 5,440,727 A | 8/1995 | Bhide et al. | |
| 5,636,373 A | 6/1997 | Glendening et al. | |
| 5,918,040 A * | 6/1999 | Jarvis | 713/375 |
| 6,044,447 A | 3/2000 | Averill et al. | |
| 6,209,106 B1 * | 3/2001 | Kubala et al. | 713/500 |
| 6,510,496 B1 | 1/2003 | Tarui et al. | |
| 7,356,725 B2 * | 4/2008 | Engler et al. | 713/503 |
| 2003/0233479 A1 * | 12/2003 | Keohane et al. | 709/248 |
| 2006/0037027 A1 * | 2/2006 | Carlson et al. | 719/313 |
| 2006/0133426 A1 * | 6/2006 | Craddock et al. | 370/503 |
| 2007/0011495 A1 | 1/2007 | Armstrong et al. | |
| 2008/0120518 A1 | 5/2008 | Ritz et al. | |
| 2008/0163239 A1 | 7/2008 | Sugumar et al. | |
| 2009/0013149 A1 | 1/2009 | Uhlig et al. | |

\* cited by examiner

*Primary Examiner*—Chun Cao
(74) *Attorney, Agent, or Firm*—Wood, Herron & Evans, LLP

(57) ABSTRACT

An apparatus, program product and method for automatically and transparently determining the time required to migrate a logical partition. This determined latency may be used to update clocks and other time-related values of the migrated logical partition.

22 Claims, 3 Drawing Sheets

SYSTEM AND METHOD FOR UPDATING A TIME-RELATED STATE OF A MIGRATING LOGICAL PARTITION

CROSS-REFERENCE TO RELATED APPLICATIONS

This application is related to the following U.S. Patent Applications all filed on even date herewith, the disclosures of which are incorporated by reference herein: Ser. No. 11/735,809, entitled "SYSTEM AND METHOD FOR TRACKING THE MEMORY STATE OF A MIGRATING LOGICAL PARTITION" by William Joseph Armstrong et al.; Ser. No. 11/735,830, entitled "SYSTEM AND METHOD FOR MAINTAINING PAGE TABLES USED DURING A LOGICAL PARTITION MIGRATION" by Stuart Zachary Jacobs et al.; and Ser. No. 11/735,770 entitled "SYSTEM AND METHOD FOR DETERMINING FIRMWARE COMPATIBILITY FOR MIGRATING LOGICAL PARTITIONS" by William Joseph Armstrong et al.

FIELD OF THE INVENTION

The present invention relates to computing systems, and more particularly, to managing a logical partition migration between computer systems.

BACKGROUND OF THE INVENTION

Data migration refers generally to the processes of moving computer data from one computer location to another. For instance, an administrator may facilitate maintenance or updates by transferring applications and/or memory from one operating system or computer to another. While necessary, data migration can pose a tremendous challenge and risk to businesses, government agencies and individuals that depend upon uninterrupted computer access. Too often, software installation problems occur. Such problems may be attributable to faulty program code or unforeseeable interactions within a processing environment. Such problems can result in costly system errors and downtime.

Problems associated with data migration may be compounded in logically partitioned environments, where unique resource sharing and access practices may present additional considerations. Logical partitioning provides a programmed architecture suited for assigning and sharing computing assets. A partition may logically comprise a portion of a machine's physical processors, memory and other resources. As such, an administrator may allocate the same resources to more than one partition. Each partition may additionally host an operating system, in addition to multiple virtual processors. Underlying firmware, called a hypervisor, assigns and dispatches physical processors to each virtual processor. Each partition typically has unique connections for communicating with a network. In this manner, each partition operates largely as if it is a separate computer.

During a migration, the state of the migrating logical partition, including applicable memory, processor/register state information, and connection information regarding physical interface/discs associated with the virtual partition components, etc., is transferred to another logical partition of another computer. In a sense, a migration may comprise moving a single 'live' partition from a target system hypervisor to a source system hypervisor. The migration may be motivated to accommodate new hardware or program updates on the computer of the migrating logical partition. Oftentimes the migrated logical partition is eventually returned to the original logical partition location.

The migrating partition ideally continues work without interruption on the new logical partition. The hypervisor may be responsible for providing the infrastructure that allows for the migration to occur from the source logical partition system hypervisor to a target system hypervisor logical partition. The target logical partition may be newly created for the migration, is typically located on a separate, physical computer, and is configured to accommodate the state of the transferred logical partition.

In scenarios where a logical partition is migrating to another computer, it is likely that data migrating from the transferring, or source computer, is delayed in reaching the receiving, or target computer. While such latency may comprise a relatively small amount time, even a slight delay can have potentially significant affects in a highly integrated, logically partitioned environment. For instance, because the source and target logical partitions are located on physically separate machines, the time-of-day clocks for each may not be synchronized. As a result, the respective start and stop times for each of the target and source systems may be different. The time-of-day clock for the migrated logical partition (corresponding to a particular instance of the partition) may furthermore have no clear way to be updated, and may consequently be delayed, itself, by the amount of the latency. Such clock inaccuracies may cause a loss of applications and data, and can generally lead to imprecise and/or interrupted service.

Any such time-related problem stemming from an unsuccessful migration can thus result in the loss of business and man hours. Even where an administrator is skilled enough to manually correct the clock(s) of a migrating logical partition, the manual process would be preclusively tedious and complicated. Such potential problems may further translate into a reluctance to migrate partitions in instances where such transfers would otherwise improve system performance.

There is consequently a need for an improved manner of migrating data and associated processes within a logically partitioned environment.

SUMMARY OF THE INVENTION

The present invention provides an apparatus, method and program product configured to automatically update time-related states affected by the migration of a source logical partition to a target logical partition. One aspect of the invention may determine a time-of-day state associated with the target logical partition, as well as a time-of-day state associated with the source logical partition. Embodiments may use the respective time-of-day states to determine a latency value. More particularly, the latency may be calculated by subtracting the time-of-day state associated with the source logical partition from the time-of-day state associated with the target logical partition. In one embodiment, the respective time-of-day states associated with the source and logical partitions are more particularly associated with the respective hypervisors used by the logical partitions. Where desired, the determined latency may be output for subsequent use.

For instance, embodiments consistent with the invention may determine a partition time-of-day state of the target logical partition by adding a source partition time-of-day to the determined latency value. In another embodiment, an offset may be determined using the determined latency. The determined offset, in turn, may be used to determine a current partition-time-of day of the target logical partition.

Embodiments consistent with the invention may determine the time-of-day state associated with the target logical partition by synchronizing the time-of-day state associated with the target logical partition with the time-of-day state associated with the source logical partition. To this end, aspects of the invention may synchronize the time-of-day states by synchronizing the time-of-day state associated with the target logical partition with a partition time-of-day state of the target logical partition. When applicable, embodiments may automatically determine if the time-of-day state associated with the target logical partition and the time-of-day state associated with the source logical partition are synchronized.

Other embodiments consistent with the invention may determine the time-of-day state associated with the target logical partition by comparing a value derived from a timestamp generated by the source logical partition to the time-of-day state associated with the target logical partition to determine a time difference.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
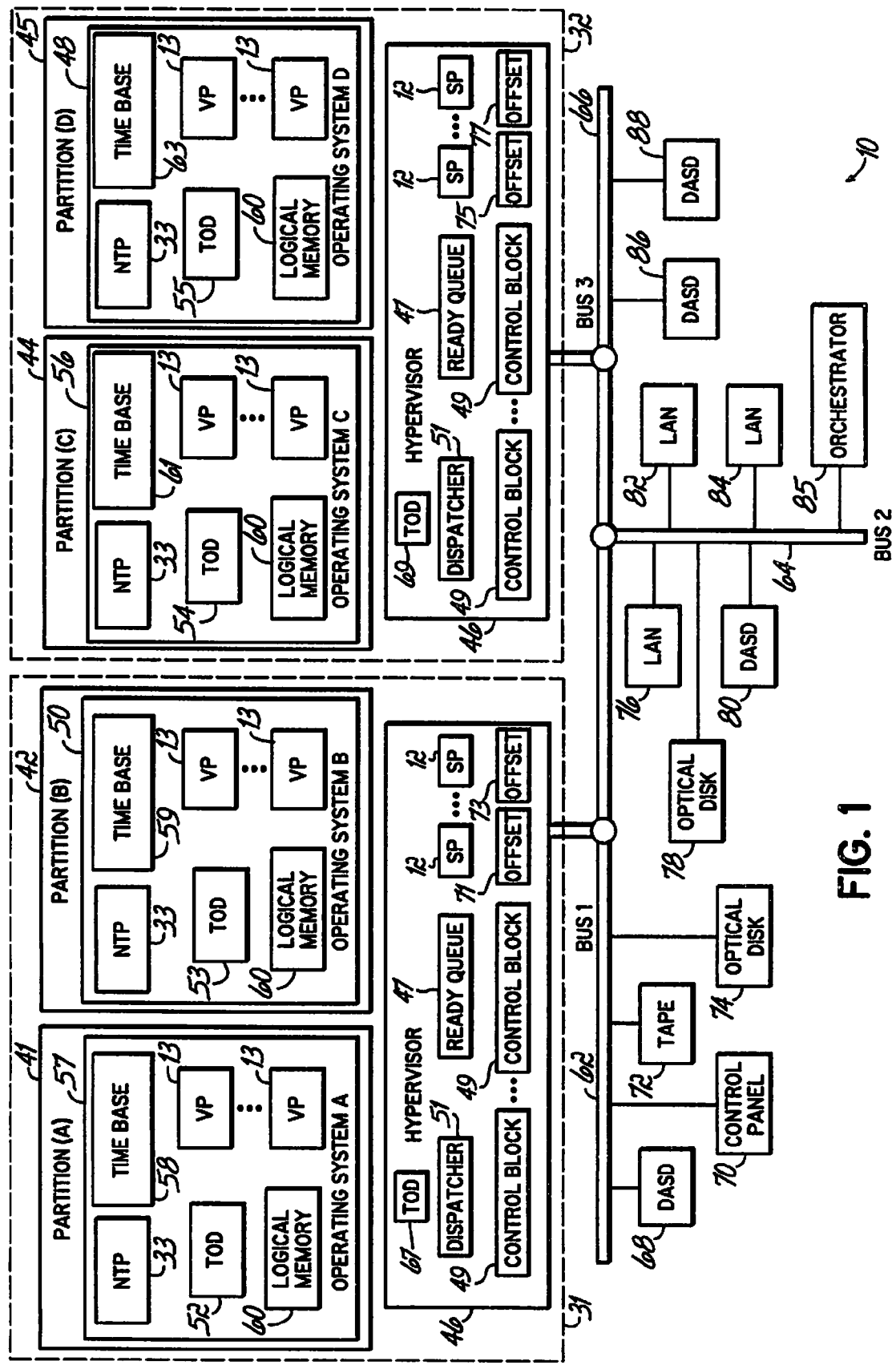
FIG. 1 is a block diagram of a computer system configured to determine latency associated with migrating a logical partition in accordance with the principles of the present invention.

Features of the present invention include an apparatus, program product and method for automatically determining the time required to migrate a logical partition. In so doing, embodiments may update the time state of a partition following its migration from one system to another without disruption of the partition runtime state. That is, the determined latency may be used to update clocks of the migrated logical partition. Aspects of the invention may be transparent they do not require input from the running operating system before or after migration, and may not disrupt the operating system runtime state after the migration is complete.

During migration, a logical partition may run in a virtualized environment to be separate from the physical hardware underneath. The hypervisor may be responsible for providing the infrastructure that allows for the migration to occur from the source logical partition to a typically new, target logical partition. The target logical partition may be newly created for the migration, having an infrastructure to accommodate the transferred logical partition.

Within its virtual environment, the logical partition may include virtual counterparts to clocks and counters relied upon in conventional, non-partitioned environments. More specifically, conventional operating systems have a notion of software time and hardware time. Software time may be embodied by interfaces that typically provide the time-of-day during runtime, and may be based on a central processing unit (CPU) counter. The CPU counter used for time keeping is commonly referred to as the time base. Hardware time is persistent, and is generally based on a battery backed device that persists its time-of-day state across power outages. For purposes of "time-of-day," a "state" may comprise a single value, multiple values, or multiple mechanisms whose combined states constitute what could be viewed as the time-of-day for a given moment. A typical maintenance practice of time-of-day in an operating system may be to keep software time as accurate as possible (with respect to some external time reference) while only periodically updating the hardware clock.

A logically partitioned system may provide a virtual hardware clock for each partitioned operating system. The software clock mechanism may be fully contained in the operating system and depends only on an underlying counter register (e.g., time base), so no virtualization may be necessary or desired. The hypervisor may maintain a time base offset (TBO) for each partition. Like any layer of a logically partitioned system, the hypervisor layer, may maintain its own hardware and software time-of-day facility, separate from those in the partitions. The time base offset may enable each partition to view a time base state that may be different from that of the hypervisor layer or any other partition.

As part of a migration, the migrated partition's virtual hardware clock and time base offset should be updated to reflect the correct passage of wall-clock time corresponding to the time the partition was in transition from the source to the target system. This is not intuitive because the start and end times for the migration operation typically occur on different physical systems. To address this scenario, the source and target systems may each maintain some time reference that may be synchronized between them. In most embodiments, this synchronization is unlikely to be accomplished in the hypervisors of the target and source systems, which typically have different time-of-day settings. Moreover, it may be inefficient to synchronize the time-of-day clocks among two or more instances of a system hypervisor using direct (system firmware layer) communications between them. Implementing a variant of Network Time Protocol in the hypervisor layer, for instance, may involve regular dispatches of each hypervisor client, thus reducing utilization by the logical partitions on each system.

In one embodiment consistent with the invention, a logical partition may be designated as a time reference partition for the hypervisor time-of-day. When a single partition is given this attribute, the hypervisor may synchronize its time-of-day with the virtual hardware clock for that partition. In the preferred environment for partition migration, the time reference partitions on the source and target systems may both run an application that implements a Network Time Protocol algorithm. Configuring the Network Time Protocol on each time reference partition to reference the same time server may ensure that the host and target hypervisor time-of-day clocks are synchronized with respect to each other.

If more than one partition on a system is given the time reference partition attribute, then the hypervisor may synchronize with the longest running partition. If the time reference partition that the hypervisor layer is synchronizing with powers off, fails, or is migrated to another system, then the next-oldest running partition TRP may be used.

Given that the source and target systems may be synchronized with respect to time-of-day, timestamps may be recorded on the source and target system at certain points in partition migration process, such that the migration latency can be accurately determined.

On the source system, the following may be recorded at the beginning of the migration process, immediately following suspension of the source partition, and sent to the target system: the source partition time-of-day (TOD_sp), the source partition time base (TB_sp), the source hypervisor time-of-day (TOD_sh), and any other time-related mechanisms that should be updated when the migration is complete.

On the target system, the following may be recorded at the end of the migration process, at any point prior to the resumption of the partition: the target hypervisor time-of-day (TOD_th), the target hypervisor time base (TB_th), and any other time-related mechanisms that must be updated when the migration is complete, and that are dependent on the state of the system firmware level.

The migration latency may be calculated as a value equaling the target hypervisor time-of-day minus the source hypervisor time-of-day, i.e., TOD_th−TOD_sh.

All time-related mechanisms that require an update may then be done with the appropriate source snapshot and format conversions. For example, the migrated partition time-of-day clock may be equal to the source partition time-of-day plus the target hypervisor time-of-day, minus the source hypervisor time-of-day, or: TOD_sp+TOD_th−TOD_sh.

The migrated partition time base offset may be determined by adding the source partition time base to the product of the time base ticks multiplied by the latency, minus the target hypervisor time-of-day, or TB_sp+time_base_ticks (TOD_th−TOD_sh)−TB_th.

In some applications, it could be problematic for the target hypervisor to assume that the source hypervisor is using a time reference partition. If the source partition hypervisor is not using a time reference partition, or if the source and target system time reference partitions are not synchronized for some reason, the source and target hypervisor time-of day clocks states may be significantly out of synchronization. In that event, the migration latency calculation could be erroneous.

Embodiments consistent with the invention may address this scenario by capitalizing on message passing that is used for source-target partition communications during the migration process. One such message may be used to communicate the target system timestamps, as well as an indication of whether the target system is using a time reference partition.

In addition, the target hypervisor may monitor timestamps on migration-related messages sent by the source hypervisor in order to determine if the source and target hypervisor time-of-day states are synchronized to within some tolerance (some round-trip network latency can be estimated or calculated as part of this evaluation). For example, the target may determine a difference between the source and target hypervisor time-of-day by calculating the average of the first n differences calculated by (target_current_TOD−source_message_time_stamp). If the source and target hypervisor time-of-day states are found to be unsynchronized, then the result of migration message timestamp evaluation may be used to provide a best guess of the difference between them.

Hardware and Software Environment

Turning more particularly to the drawings, FIG. 1 illustrates a data processing system 10, or apparatus, configured to determine latency associated with migrating a logical partition 42. System 10 more particularly represents the primary software components and resources used to implement a logically partitioned environment consistent with embodiments of the invention. As such, FIG. 1 includes a computing architecture characterized as a virtual machine design, as developed by International Business Machines Corporation. The networked system 10 includes a plurality of partitions 41, 42 and 44, 45 that may share common processing resources among multiple processes within their respective server computers 31, 32. Each computer 31, 32 may rely upon a single computing machine having one or more physical processors 12, or central processing units (CPU's). The physical processors 12 may execute software configured to simulate multiple virtual processors 13.

The partitions 41, 42, 44, 45 may logically comprise a portion of a system's physical processors 12, memory and other resources as assigned by an administrator. Each partition 41, 42, 44, 45 typically hosts an operating system 48, 50, 56, 57 and may have multiple virtual processors 13. In this manner, each partition 41, 42, 44, 45 may operate largely as if it is a separate computer.

As shown in FIG. 1, the environment comprising each partition 41, 42, 44, 45 may also include time-of-day clocks 52, 53, 54, 55 and time base clocks 58, 59, 61, 63. As discussed herein, the partition time-of-day clocks 52, 53, 54, 55 may comprise virtual versions of conventional hardware time-of-day clocks. Time base clocks 58, 59, 61, 63 may comprise a counter function, as well as an indication of the period or frequency of the counter function. Network Time Protocol 33 is a protocol for synchronizing the clocks of computer systems over packet-switched, variable, latency data networks.

Underlying programs, called hypervisors 46, or partition managers, may assign physical resources to each partition 41, 42, 44, 45. For instance, a hypervisor 46 may intercept requests for resources from operating systems 48, 50, 56, 57 to globally share and allocate resources. If the partitions 41, 42 and 44, 45 within each server 31, 32 are respectively sharing processors 12, the hypervisor 46 allocates physical processor cycles between the virtual processors 13 of the partitions 41 and 42, 44 and 45 sharing the physical processors 12. Hypervisors 46 may access offsets 71, 73, 75, 77 stored for each logical partition 41, 42, 44, 45. Offsets 71, 73, 75, 77 may be used to determine partition time-of-day 52, 53, 54, 55 subsequent to the initial migration, time-of-day clock setting.

Each operating system 48, 50, 56, 57 controls the primary operations of its respective logical partition 41, 42, 44, 45 in a manner similar to the operating system of a non-partitioned computer. Each logical partition 41, 42, 44, 45 may execute in a separate memory space, represented by logical memory 60. Moreover, each logical partition 41, 42, 44, 45 may be statically and/or dynamically allocated a portion of the available resources in its respective computer 31, 32 of networked system 10. For example and as discussed herein, each logical partition 41, 42, 44, 45 may share one or more physical processors 12, as well as a portion of the available memory space for use in logical memory 60. In this manner, a given processor may be utilized by more than one logical partition.

The hypervisors 46 may include a dispatcher 51 that manages the dispatching of virtual processors to physical processors on a dispatch list, or ready queue 47. The ready queue 47 comprises memory that includes a list of virtual processors having work that is waiting to be dispatched on a physical processor 12. The hypervisors 46 shown in FIG. 1 also includes physical processors 12, in addition to processor control blocks 49. The processor control blocks 49 comprise memory that includes a list of virtual processors waiting for access on a particular physical processor 12. As shown in FIG. 1, the hypervisors 46 may also each include a time-of-day clock 67, 69.

Additional resources, e.g., mass storage, backup storage, user input, network connections, and the like, are typically allocated to one or more logical partitions in a manner well known in the art. Resources can be allocated in a number of manners, e.g., on a bus-by-bus basis, or on a resource-by-resource basis, with multiple logical partitions sharing resources on the same bus. Some resources may even be allocated to multiple logical partitions at a time. FIG. 1 illustrates, for example, three logical buses 62, 64 and 66, with a plurality of resources on bus 62, including a direct access storage device (DASD) 68, a control panel 70, a tape drive 72 and an optical disk drive 74, allocated to a partition. Bus 64, on the other hand, may have resources allocated on a resource-by-resource basis, e.g., with local area network (LAN) adaptor 76, optical disk drive 78 and DASD 80 allocated to logical partition 42, and LAN adaptors 82 and 84 allocated to logical partition 44. Bus 66 may represent, for example, a bus allocated specifically to logical partition 44, such that all resources on the bus, e.g., DASD's 86 and 88, are allocated to the same logical partition.

An orchestrator program 85 may communicate with migrating partitions to coordinate and otherwise facilitate the migration, as described below in detail. While the orchestrator program 85 program is shown in FIG. 1 as being networked to the pair of servers 31 and 32 of system 30, one skilled in the art should appreciate that another orchestrator program may be located within a server computer 31, 32 or other location within the system 30 suitable to manage a the migration between a pair of migrating partitions.

It will be appreciated that the illustration of specific resources in FIG. 1 is merely exemplary in nature, and that any combination and arrangement of resources may be allocated to any logical partition in the alternative. For instance, it will be appreciated by one of skill in the art that in some implementations resources can be reallocated on a dynamic basis to service the needs of other logical partitions. Furthermore, it will be appreciated that resources may also be represented in terms of the input/output processors (IOP's) used to interface the computer with the specific hardware devices.

The various software components and resources illustrated in FIG. 1 may be implemented in a number of manners, including using various computer software applications, routines, components, programs, objects, modules, data structures, etc., referred to hereinafter as "computer programs", "tools", "programs" or "program code". Program code typically comprises one or more instructions that are resident at various times in various memory and storage devices in the computer, and that, when read and executed by one or more processors in the computer, cause that computer to perform the steps necessary to execute steps or elements embodying the various aspects of the invention.

Moreover, while the invention has and hereinafter will be described in the context of fully functioning computers, those skilled in the art will appreciate that the various embodiments of the invention are capable of being distributed as a program product in a variety of forms, and that the invention applies equally regardless of the particular type of computer readable medium used to actually carry out the distribution. Examples of computer readable media include, but are not limited to tangible, recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environment illustrated in FIG. 1 is not intended to limit the present invention. Though not shown in FIG. 1, for instance, one skilled in the art will appreciate that other partitions may be included within other embodiments, including a partition that comprises part of the hypervisors 46. This hypervisor partition may function in many ways like the conventional partitions 41, 42, 44, 45 (and associated operating systems), but has no user interface for the customer to protect it from failures that might otherwise come about through user interaction. Furthermore, while four logical partitions 41, 42, 44, 45 are shown in FIG. 1, one skilled in the art will appreciate that more or fewer partitions may be implemented as needed. Other alternative hardware and/or software environments may thus be used without departing from the scope of the invention.

Processes for Determining the Latency of Migrating a Logical Partition

Figure 2:
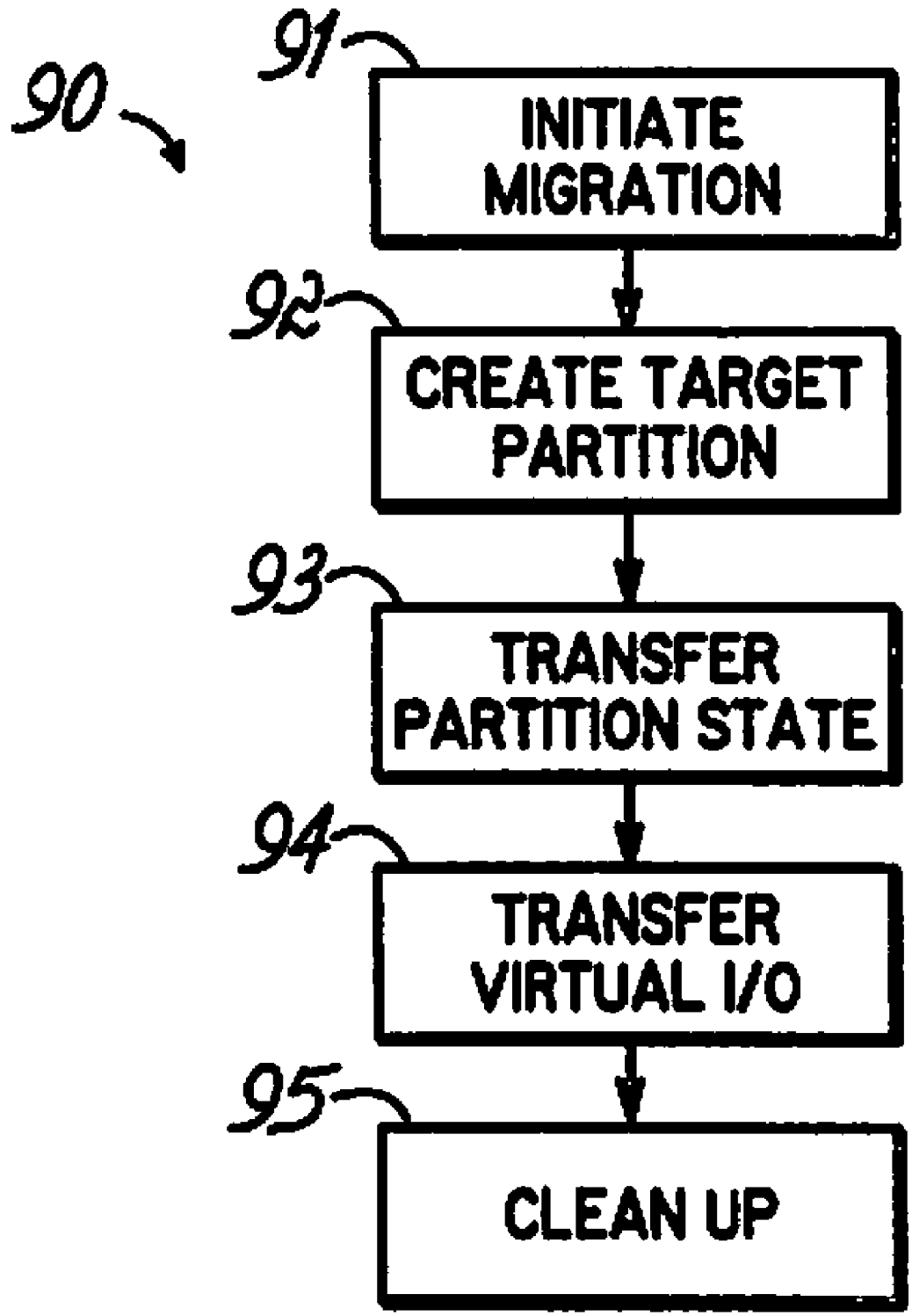
FIG. 2 is a flowchart having steps executable by the system of FIG. 1 for conducting a migration of the local partition of FIG. 1.

FIG. 2 is a flowchart 90 having steps executable by the system of FIG. 1 for executing a migration of the logical partition 42 of FIG. 1. Generally during a migration, the state of the migrating logical partition 42 is transferred to a newly created logical partition 44. The migrating partition 42 ideally continues work without interruption on the new logical partition 44 and on the target system 32.

Turning more particularly to the flowchart 90, migration processes may be initiated at block 91. Initiation processes may include prompting the orchestrator program 85 to initially communicate with a pair of logical partitions 42, 44 involved in an impending migration. The orchestrator program 85 may thus begin coordinating and otherwise facilitating the migration.

As such, the orchestrator program 85 may initiate the creation of the target partition 44 at block 92 of FIG. 2. As discussed herein, the target partition 44 is typically located on a separate, physical computer 32, and may comprise a relatively empty framework for accommodating the state of the transferred logical partition 42. Where so configured, the target logical partition 44 may include data used by the system 10 to ensure basic firmware compatibility between the target and source logical partitions 42, 44.

Memory and other state information, e.g. processor, clock and register state information, may be transferred at block 93 from the source logical partition 42 to the target logical partition 44. System processes may continue to track changes to the state information that may occur during the migration of the memory.

Similarly, virtual I/O data may be transferred at block 94 from the source logical partition 42 to the target logical partition 44. Examples of virtual I/O may include connections from the virtual components of the migrating partition to interfaces and physical resources, e.g., discs, on the source system 31. Such connection information may be transferred at block 94 so that the migrated logical partition may near seamlessly continue its work.

While the migrated logical partition was active on the source computer 31, the partition 42 may have utilized memory and other resources reserved for the partition 42 on the source system 31. Once the partition has migrated, however, it no longer needs those resources. At block 95 of FIG. 2, the orchestrator program 85 may free up the resources for other applications on the source computer 31.

Figure 3:
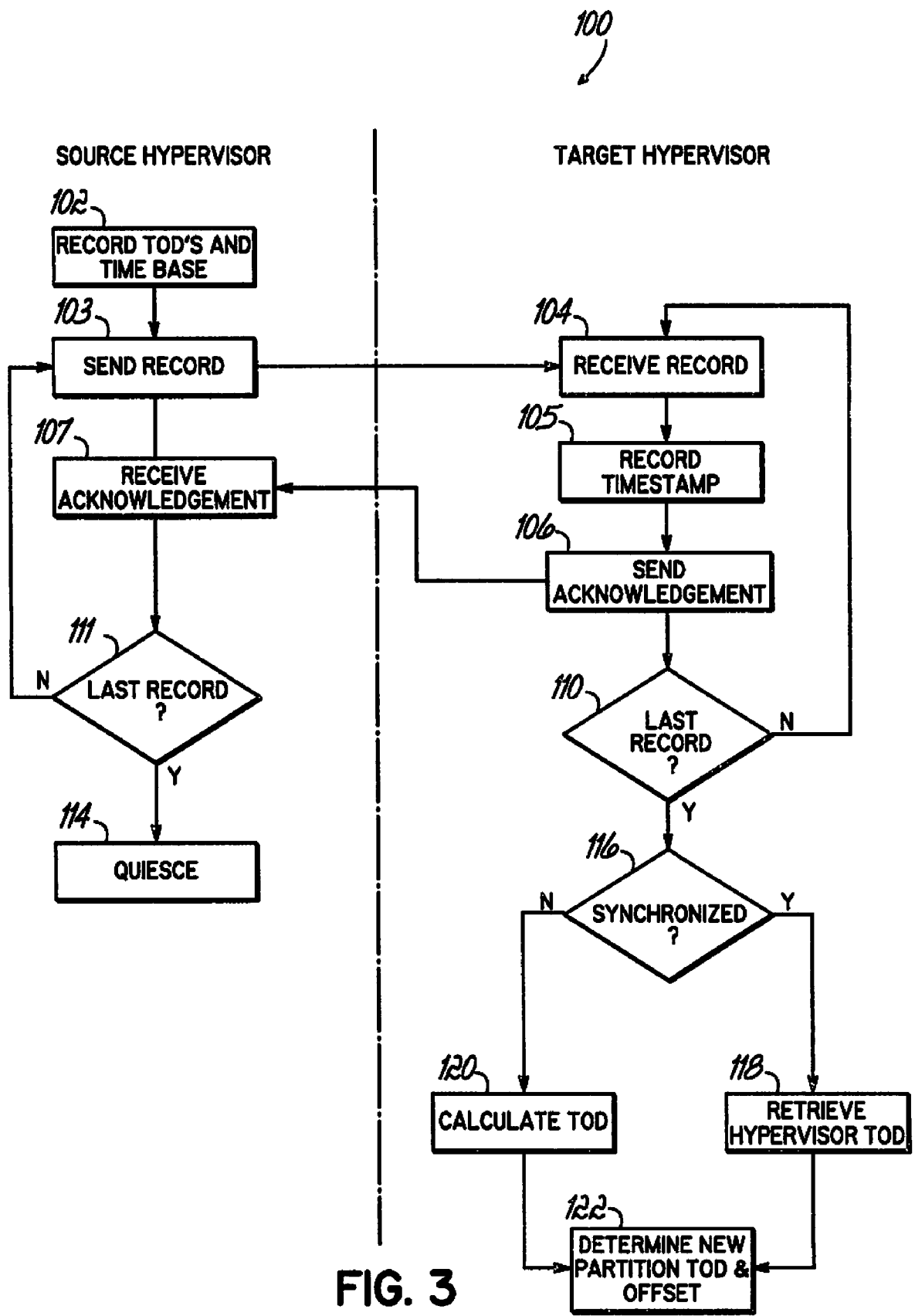
FIG. 3 is a flowchart having steps executable by the system of FIG. 1 for determining updated clocks settings for the migrating logical partition.

FIG. 3 is a flowchart 100 having steps executable by the system 10 of FIG. 1 for determining updated clocks settings and other time-related values for the migrated logical partition 44. Moreover, the processes of the flowchart 100 may have application in the context of block 93 of FIG. 2 in so much as time-related state information may be exchanged between source and target partitions 42, 44. Turning more particularly to block 102 of FIG. 3, the hypervisor 46 associated with the source logical partition 42 may record the value of the partition time-of-day clock 53, time base clock 59 and hypervisor time-of-day clock 67. Some or all of this time-related data may be sent at block 103 to the hypervisor 46 associated with the target logical partition 44. The time-related data may be time stamped on a partition state record sent to the hypervisor 46 of the target logical partition 44 during the course of regular operations. A typical partition state record may additionally include communications relating to memory transfers.

The hypervisor 46 associated with the target logical partition 44 may receive at block 104 the partition state record with the timestamp. The hypervisor 46 associated with the target logical partition 44 may record the timestamp at block 105 of FIG. 3. Acknowledgment of the receipt of the partition state record may be sent at block 106 from the hypervisor 46 associated with the target logical partition 44, and received at block 107 by the hypervisor 46 associated with the source logical partition 42. Any timestamp information associated with the acknowledgement may be recorded at block 107. Communications of timestamp and other information may continue as such until at blocks 110 and/or 111, it is determined that the last partition state record has been sent. That is, all of the hypervisor/source logical partition's communications have been accomplished.

At this point, the hypervisor 46 associated with the source logical partition 42 may at block 114 quiesce, or cease to dispatch processes. The hypervisor 46 associated with the target logical partition 44 may determine at block 116 if the hypervisor time-of-day clocks of the respective logical partitions are synchronized.

Input for this determination may include a message sent at block 102 indicating if the time-of-day clock of the logical partition was synchronized with a network clock. Such synchronization may occur, for instance, where the time-of-day clocks of the logical partitions 42, 44 involved in the migration synchronize using Network Time Protocol 33. Network Time Protocol is a protocol for synchronizing the clocks of computer systems over packet-switched, variable, latency data networks.

Each time-of-day clock 67, 69 of the respective hypervisors 46 may synchronize with the (also synchronized) time-of-day clock 53, 54 of the corresponding logical partition. As such, the time-of-day clocks of the hypervisors may become synchronized 67, 69 using the partition time-of-day clocks 53, 54. This feature addresses the typical scenario where the hypervisor 46 has no independent network access to a network clock mechanism, e.g., Network Time Protocol 33. Where such is the case at block 116, then the target logical partition 44 may retrieve at block 118 the value of the hypervisor time-of-day clock 69.

Where the hypervisor time-of-day clocks 67, 69 are alternatively not synchronized at block 116, then the target logical partition 44 may calculate at block 120 the time-of-day of the firmware/hypervisor on the target logical partition. This determination at block 120 may be accomplished in part by comparing timestamps received at the target logical partition 44 with the time-of-day 67 of the target's hypervisor 46. Over time, a consistent time difference (accounting for round trip travel times between the source and logical partitions) may correspond with a useable difference between the source and target hypervisor's time-of-day clocks 67, 69. For instance, there may be a generally consistent, six hour and five millisecond difference between a series of timestamps of the source computer 31 and the target computer 32. Accounting for a known five millisecond travel time for the communications, the time difference between the hypervisor time-of-day clocks 67, 69 could be estimated at around six hours.

The hypervisor 46 associated with the target logical partition 44 may use the time-of-day of the firmware/hypervisor of the target logical partition as determined at either block 118 or 120 to determine at block 122 the time-of-day and time base offset values for the migrating logical partition.

More particularly, the migration latency may be calculated as a value equaling the target hypervisor time-of-day 69 minus the source hypervisor time-of-day 67, i.e., TOD_th−TOD_sh.

All time-related mechanisms that require an update may then be done with the appropriate source information and format conversions. For example, the migrated partition time-of-day clock 54 may be equal to the source partition time-of-day 53 plus the target hypervisor time-of-day 69, minus the source hypervisor time-of-day 67, or: TOD_sp+TOD_th−TOD_sh.

The migrated partition time base offset 73 may be determined by adding the source partition time base 59 to the product of the time base ticks multiplied by the latency, minus the target hypervisor time-of-day 69, or TB_sp+time_base_ticks(TOD_th−TOD_sh)−TB_th. Subsequent to the migration, the offset may be used to determine the partition current time-of-day. For example, the partition 44 may add the offset to the time base 54 (which may include a constant indicative of the period of the counter multiplied by the counter value, as discussed herein).

While the present invention has been illustrated by a description of various embodiments and while these embodiments have been described in considerable detail, it is not the intention of the applicants to restrict, or in any way limit, the scope of the appended claims to such detail. For instance, another embodiment supports migration between logical partitions of the same computer. Processes disclosed in the above embodiments may also apply in the case of inactive partition migration. For example, when a partition is migrated in the inactive state, its complete runtime state may be stored offline on a disk drive. The partition may be activated (caused to resume execution) at an arbitrarily later time, without having to reboot the partition. A similar algorithm for hypervisor time synchronization may apply. As such, additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of updating time-related values affected by the migration of a source logical partition to a target logical partition, the method comprising:
   determining a time-of-day state associated with the target logical partition;
   determining a time-of-day state associated with the source logical partition;

determining a latency value by subtracting the time-of-day state associated with the source logical partition from the time-of-day state associated with the target logical partition; and updating at least one time-related value affected by the migration of the source logical partition to the target logical partition using the determined latency value.

2. The method of claim 1, further comprising outputting the determined latency value.

3. The method of claim 1, further comprising determining a partition time-of-day state of the target logical partition by adding a source partition time-of-day to the determined latency value.

4. The method of claim 1, further comprising determining an offset using the determined latency.

5. The method of claim 4, further comprising using the determined offset to determine a current partition-time-of day of the target logical partition.

6. The method of claim 1, wherein determining the time-of-day state associated with the target logical partition further comprises synchronizing the time-of-day state associated with the target logical partition with the time-of-day state associated with the source logical partition.

7. The method of claim 6, wherein synchronizing the time-of-day states further comprises synchronizing the time-of-day state associated with the target logical partition with a partition time-of-day state of the target logical partition.

8. The method of claim 1, wherein determining the time-of-day state associated with the target logical partition further comprises comparing a value derived from a timestamp generated by the source logical partition to the time-of-day state associated with the target logical partition to determine a time difference.

9. The method of claim 1, further comprising determining if the time-of-day state associated with the target logical partition with the time-of-day state associated with the source logical partition are synchronized.

10. An apparatus comprising:
a processor;
a target logical partition configured to use cycles of the processor; and
program code in communication with the target logical partition and executable by the processor, the program code configured to update time-related values affected by a migration of a source logical partition to the target logical partition by determining a time-of-day state associated with the target logical partition, determining a time-of-day state associated with the source logical partition, and determining a latency value by subtracting the time-of-day state associated with the source logical partition from the time-of-day state associated with the target logical partition.

11. The apparatus of claim 10, wherein the target logical partition is located on a different physical machine than is the source logical partition.

12. The apparatus of claim 10, wherein the program code is further configured to initiate outputting the determined latency value.

13. The apparatus of claim 10, wherein the program code is further configured to initiate determining a partition time-of-day state of the target logical partition by adding a source partition time-of-day to the determined latency value.

14. The apparatus of claim 10, wherein the program code is further configured to initiate determining an offset using the determined latency.

15. The apparatus of claim 14, wherein the program code is further configured to initiate using the determined offset to determine a current partition-time-of day of the target logical partition.

16. The apparatus of claim 10, wherein the program code is further configured to initiate synchronizing the time-of-day state associated with the target logical partition with the time-of-day state associated with the source logical partition.

17. The apparatus of claim 16, wherein the program code is further configured to initiate synchronizing the time-of-day state associated with the target logical partition with a partition time-of-day state of the target logical partition.

18. The apparatus of claim 10, wherein the program code is further configured to initiate comparing a value derived from a timestamp generated by the source logical partition to the time-of-day state associated with the target logical partition to determine a time difference.

19. The apparatus of claim 10, wherein the program code is further configured to initiate determining if the time-of-day state associated with the target logical partition with the time-of-day state associated with the source logical partition are synchronized.

20. A program product, comprising:
program code in communication with source and target logical partitions, the program code configured to update time-related values affected by a migration of a source logical partition to the target logical partition by determining a time-of-day state associated with the target logical partition, determining a time-of-day state associated with the source logical partition, and determining a latency value by subtracting the time-of-day state associated with the source logical partition from the time-of-day state associated with the target logical partition; and
a non-transitory computer readable medium bearing the program code.

21. The method of claim 1, wherein the source and target logical partitions are respectively resident on source and target computers, wherein the method further comprises recording timestamps on the source and target computers during a plurality of points in time during the migration, and wherein the recorded timestamps are used when determining the latency value.

22. The method of claim 1, wherein the source and target logical partitions are respectively resident on source and target computers, wherein the source and target computers respectively include source and target hypervisors, and wherein the method further comprises determining whether time-of-day clocks for the source and target hypervisors are synchronized, determining a time-of-day for the target hypervisor in response to determining that the time-of-day clocks for the source and target hypervisors are not synchronized, and updating the time-of-day state for the target logical partition using the time-of-day determined for the target hypervisor.

* * * * *